UNITED STATES PATENT OFFICE.

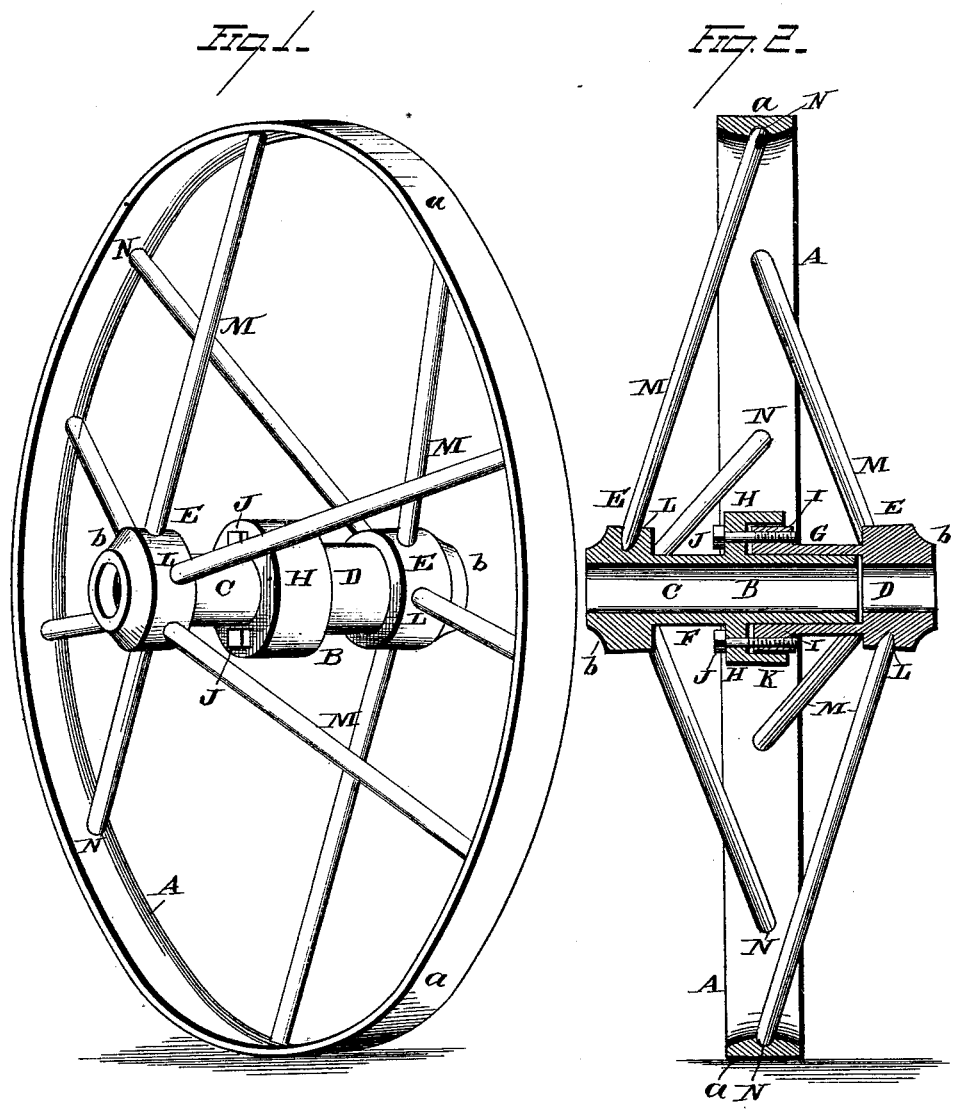

WILLIAM NEWLIN, OF ATTICA, INDIANA.

VEHICLE-WHEEL.

SPECIFICATION forming part of Letters Patent No. 234,196, dated November 9, 1880.

Application filed August 21, 1880. (No model.)

*To all whom it may concern:*

Be it known that I, WILLIAM NEWLIN, of Attica, in the county of Fountain and State of Indiana, have invented certain new and useful Improvements in Wheels; and I do hereby declare the following to be a full, clear, and exact description of the invention, such as will enable others skilled in the art to which it pertains to make and use it, reference being had to the accompanying drawings, which form part of this specification.

My invention relates to an improvement in wheels for agricultural machines and vehicles, the object being to provide a wheel of such construction that the several parts thereof may be formed of metal and readily secured together, so that the spokes will thoroughly and effectually brace the tire or felly in opposite directions and prevent the dishing of the wheel, the parts being relatively arranged and combined in such a manner that the parts of the wheel may be readily renewed when worn or broken.

With this end in view my invention consists in certain features of construction and combinations of parts, as will hereinafter be explained, and pointed out in the claims.

In the accompanying drawings, Figure 1 is a view, in perspective, of a wheel embodying the invention. Fig. 2 is a transverse section of the same.

A represents the tire, which is made of wrought-iron, the outer periphery, $a$, being flat to form the tread, while the inner periphery is of convex form to insure increased thickness at the center of the tire for spoke-sockets without materially adding to the weight or cost of the wheel.

B is the hub, it being composed of the two telescopic sections C D, each section having a hub, E, formed solid on its outer end. A flange, $b$, projecting outward from each hub, constitutes a sand-band and serves the ordinary purpose of excluding sand and dirt from the axle. The tubular portion F of section C is of smaller diameter than the tubular portion G of section D and enters the latter, thereby constituting a telescopic hub, the sections engaging with each other at their inner ends. Section C is furnished with a flange, H, which is located about midway between the opposite ends of the tubular portion or pipe F, while section D is provided with a flange, I, attached to the inner end of the tubular portion or pipe G.

Flanges H and I are secured together in an adjustable manner by means of the bolts J, which latter are inserted through flange H, and engage in screw-threaded holes formed in the flange I, or the bolts may extend through flange I and be secured in place by nuts. Flange H is constructed with a laterally-projecting flange, K, which encircles the periphery of flange I when the parts are properly secured together, and serves to prevent sand or dirt from entering between the telescopic sections.

Hubs E are each provided with any desired number of spoke-sockets, L, in which are inserted the inner ends of spokes M, the outer ends of the spokes fitting into sockets N, formed in the inner periphery of the tire, the latter being of sufficient thickness, as heretofore stated, to allow for the formation of spoke-sockets of the required depth.

Spokes M may be formed of solid bar iron or steel, or may be made of hollow tubing, the opposite ends of the spokes being rounded to enable them to be readily adjusted at the required angle.

The spokes are first inserted in the spoke-sockets in the inner hub or sleeve, and the outer ends of the spokes inserted in the corresponding spoke-sockets in the tire. Spokes are then inserted in the spoke-sockets in the outer hub or sleeve, and the tubular portion or pipe of the latter then forced over the corresponding portion of the opposite section and the outer ends of the spokes inserted in their spoke-sockets. The fastening-bolts are then screwed up, thereby operating to draw the two telescopic sections of the hub toward each other, which operation is continued until sufficient tension is exerted upon the spokes.

As the fastening-bolts are located between the two series of spokes, all strain on the axle-nut is avoided, and, further, the telescopic joint constitutes a strong and durable form of construction, and relieves the fastening-bolts of any transverse strains.

I may employ any suitable devices other than those shown and described for holding the telescopic sections together; and it is also evident that other slight changes in details of construction and relative arrangement of parts might be resorted to without departing from the spirit of the invention, and hence I would have it understood that I do not limit myself to the exact construction and arrangement of parts shown and described; but, Having fully described my invention, what I claim as new, and desire to secure by Letters Patent, is—

1. The combination, with the tire and detachable spokes, of a hub consisting of independent hub-sections, each provided with spoke-sockets and with tubular portions having flanges formed thereon, one tube constructed to slide within the other, and devices for securing said flanges together, substantially as and for the purpose set forth.

2. The combination, with a flange on one of the telescopic sections of the hub, of a flange on the other section having a laterally-projecting flange for excluding sand and dirt from the joint between the two telescopic sections, substantially as and for the purpose set forth.

3. The combination, with a telescopic hub, each section thereof being provided with a flange on its inner end and bolts for securing said flanged ends, and having spoke-sockets in their outer ends, of a metal tire formed convex on its inner side and removable spokes provided with rounded ends, which are inserted in said spoke-sockets, substantially as set forth.

In testimony that I claim the foregoing I have hereunto set my hand this 13th day of August, 1880.

WILLIAM NEWLIN.

Witnesses:
G. McDONALD,
SAML. WHITEHALL.